(12) United States Patent
Wyatt et al.

(10) Patent No.: US 9,470,560 B2
(45) Date of Patent: Oct. 18, 2016

(54) DISPLAY ASSEMBLY

(71) Applicant: ELECTRONIC TEMPERATURE INSTRUMENTS LIMITED, Sussex (GB)

(72) Inventors: Paul David Wyatt, Sussex (GB); David Parsons, Sussex (GB)

(73) Assignee: Electronic Temperature Instruments Limited, Worthing, Sussex (GB)

( * ) Notice: Subject to any disclaimer, the term of this patent is extended or adjusted under 35 U.S.C. 154(b) by 294 days.

(21) Appl. No.: 13/668,938

(22) Filed: Nov. 5, 2012

(65) Prior Publication Data

US 2014/0044147 A1 Feb. 13, 2014

(30) Foreign Application Priority Data

Aug. 13, 2012 (GB) .................................. 1214379.8

(51) Int. Cl.
*G01D 7/00* (2006.01)
*G01D 7/02* (2006.01)
*G09F 9/302* (2006.01)

(52) U.S. Cl.
CPC .............. *G01D 7/00* (2013.01); *G09F 9/3023* (2013.01); *G01D 7/02* (2013.01); *G09G 2300/023* (2013.01)

(58) Field of Classification Search
CPC ............. G02F 1/13471; G02F 1/1347; G02F 1/1323; G02F 2203/62; G02F 1/134327; G02F 1/1313; G02F 1/13476; G02F 1/133308; G02F 1/133314; G02F 1/13741; G02F 2201/122; G01K 11/165; G01K 13/002; G01K 1/028; G01K 1/08; G01K 1/026; G01K 2219/00; G01K 7/00; G09G 2300/023; G09G 3/36; G01J 5/08; G09F 9/3023; G09F 9/3026; G09F 9/35; G09F 9/46; G01D 7/02; G01D 7/04; G01D 7/08; G01D 7/00; G01D 11/24
USPC ................. 349/74, 142, 199, 77, 15, 58, 83; 374/141, 163, 170, 208, 210, E13.002, 374/100, 121, 124; 345/4, 659, 5, 33
See application file for complete search history.

(56) References Cited

U.S. PATENT DOCUMENTS

| 6,669,362 B1 * | 12/2003 | Lin .......................... G01D 7/00 345/659 |
| 8,149,182 B2 * | 4/2012 | Jin ........................ G02F 1/1323 345/3.1 |
| 2003/0058231 A1 | 3/2003 | Kitaura et al. |

(Continued)

FOREIGN PATENT DOCUMENTS

| DE | 202008002127 U1 | 6/2008 |
| GB | 2405517 A | 3/2005 |

OTHER PUBLICATIONS

DE 202008002127, Kundo Systemtechnik—English Translation.

(Continued)

*Primary Examiner* — Paisley L Arendt
*Assistant Examiner* — Angela Davison
(74) *Attorney, Agent, or Firm* — McKee, Voorhees & Sease, PLC

(57) ABSTRACT

A display assembly comprising a first display member and a second display member, wherein the first display member is at least partially superimposed upon, fixed to and rotated with respect to the second display member and the first and second display members can be selectively actuated.

24 Claims, 3 Drawing Sheets

A

B

C

D

(56) References Cited

U.S. PATENT DOCUMENTS

| | | |
|---|---|---|
| 2004/0125854 A1 | 7/2004 | Liu et al. |
| 2007/0091011 A1* | 4/2007 | Selbrede ............... G02F 1/1347 345/4 |
| 2010/0194683 A1* | 8/2010 | Piper .................... G06F 1/1626 345/156 |
| 2012/0002140 A1* | 1/2012 | Hatoyama ............. G02F 1/1337 349/76 |
| 2012/0150482 A1* | 6/2012 | Yildizyan ................ A61B 5/01 702/131 |
| 2012/0194763 A1* | 8/2012 | Cheong ............. G02F 1/133555 349/62 |

OTHER PUBLICATIONS

GB1214379.8, "Search Report under Section 17", search date Dec. 17, 2012.

* cited by examiner

DISPLAY ASSEMBLY

CROSS-REFERENCE TO RELATED APPLICATIONS

This application claims priority under 35 U.S.C. §119 to Great Britain Application No. GB 1214379.8 filed Aug. 13, 2012, herein incorporated by reference in its entirety.

BACKGROUND OF THE INVENTION

The present invention relates to a display assembly, and more particularly relates to a liquid crystal display assembly and a thermometer comprising the display assembly.

Common displays can present information only at a single fixed orientation. Examples of such displays include those on digital watches, calculators, electronic signs, electronic thermometers and other similar devices.

The information provided by the display is only easily read by a user when the information is orientated according to the user's field of vision. It is difficult for a user to read the information if the user is viewing the information from one side or upside-down.

SUMMARY OF THE INVENTION

The present invention provides a display assembly comprising a first display member and a second display member, wherein the first display member is at least partially superimposed upon, fixed to and rotated with respect to the second display member; and the first and second display members can be selectively actuated.

The present invention further provides a display assembly and a thermometer comprising the display assembly as claimed.

BRIEF DESCRIPTION OF THE DRAWINGS

In order that the present invention may be readily understood, embodiments thereof will now be described, by way of example, with reference to the accompanying drawings, in which.

DETAILED DESCRIPTION OF THE EXEMPLARY EMBODIMENTS

Figure 1:
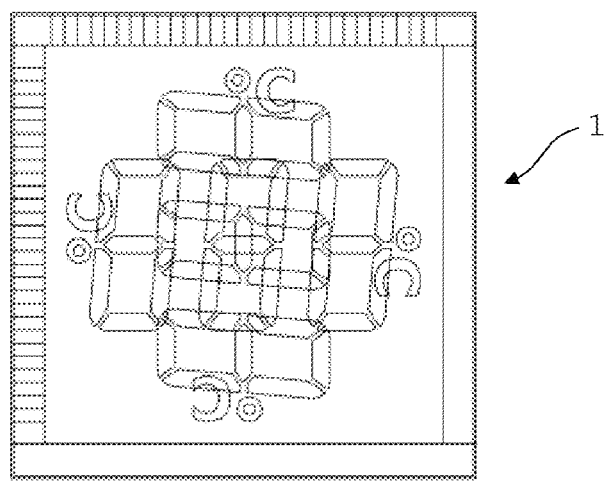
FIG. 1 shows a plan view of a display assembly embodying the present invention.
Figure 2:
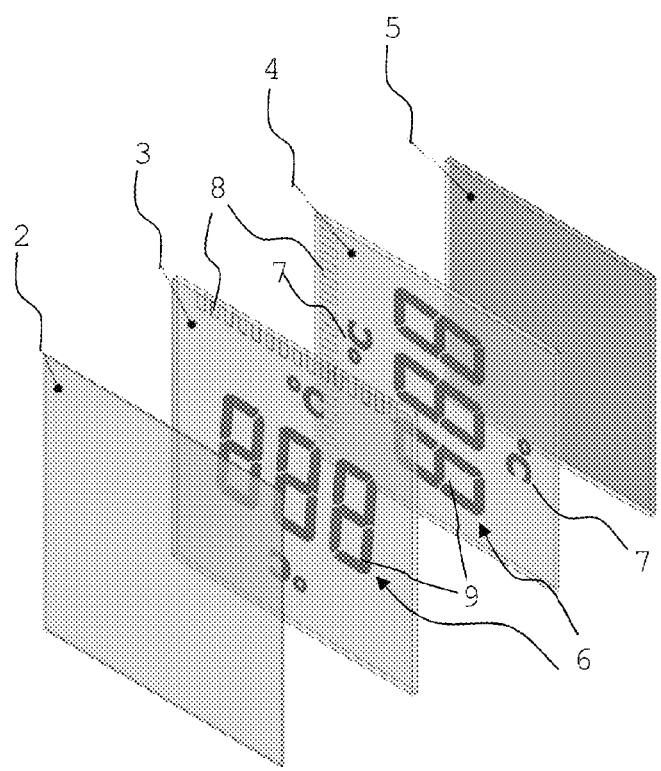
FIG. 2 shows an exploded perspective view of the display assembly of FIG. 1.

FIGS. 1 and 2 show a display assembly 1 embodying the present invention. The display assembly 1 comprises a polarizer 2, a first display member 3, a second display member 4 and a backing member 5, sandwiched together. The display members 3, 4 are panels, each comprising three seven-segment displays 6 and 2° C. measurement unit displays 7. Each segment display 6 comprises seven segments 9. Each display member 3, 4 also comprise contacts 8 along one side edge.

FIG. 2 shows an exploded perspective view of the flat or "sandwich" layer structure shown in FIG. 1.

In this exemplary embodiment, the display assembly 1 is square and the first and second display members 3, 4 are layered in the "sandwich" structure so that the first display member 3 is superimposed upon the second display member 4. In addition, the first display member 3 is rotated with respect to the second display member 4. In this embodiment, the display members 3, 4 are perpendicular. In the assembly 1, the first display member 3 is fixed to the second display member 4, described later.

The first and second display members 3, 4 may be selectively actuated so that a user may view the presented information on either or both display members 3, 4, from two or more orientations. In some embodiments the display members 3, 4 may be exclusively selectively actuated, i.e. wherein only a single display member may be actuated at a given time.

As shown in FIG. 2, the back panel 5 comprises a backing element such as glass and a rear transflective (i.e. transmissive and reflective) polarizer. The display assembly 1 may further comprise an illumination unit (not shown) such as an LED for lighting one or more of the display members 3,4 or any portion such as the front or back of the display assembly 1.

Figure 3:
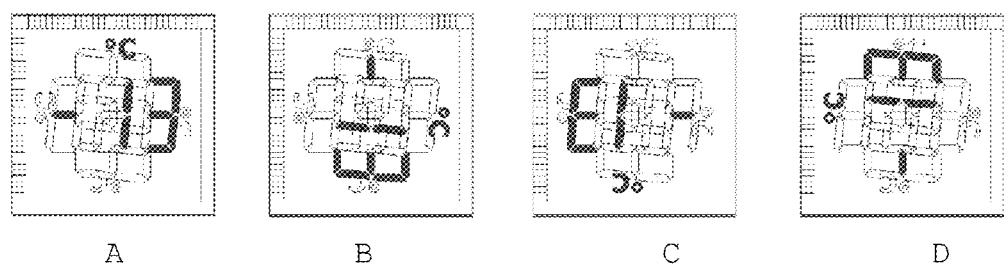
FIG. 3 shows four views (A-D) of the display assembly of FIGS. 1 and 2 in use at each of four orientations: 0°, 90°, 180° and 270°.

FIG. 3 shows four views (A-D) of the display assembly 1, illustrating the "rotatable" nature of the display assembly 1.

In the embodiment shown, each display member 3,4 comprises one ° C. display 7 located above a linear arrangement of the three seven-segment displays, and the second ° C. display 7 is located below the three seven-segment displays, and is inverted.

Each of the first and second display members 3,4 can present information in two orientations (at 180° to one another) due to the symmetrical nature of the segment displays and the use of the two ° C. displays, one inverted with the respect to the other.

In use, the actuated display member 3, 4 can be viewable through the other display member 3, 4. This means that, for example, when viewed from above, if the lower display member is illuminated (actuated) this lower display member is viewable through the upper display member which may or may not be illuminated. It follows that when no display members 3, 4 are in use, each display member 3, 4 is substantially viewable through one or more of the other display members 3, 4 (i.e. the display members 3, 4 are substantially transparent). The display members 3,4 may only be "substantially" viewable since some portion of the display members 3,4 may be obscured by another portion of a given display member 3,4 or of the display assembly 1, for example the outline of one or more of the segments 9. Accordingly, in each of the orientations, the display assembly 1 appears to the user to comprise a single display.

The configuration of display members 3, 4 at 90° to one another allows for information to be displayed at any one of four orientations as shown.

FIG. 3A shows the display assembly 1 presenting information in a first, upright, orientation. Here, a portion of the first display member 3 is actuated to indicate "−13° C." in an upright orientation. The actuated portion of the display member 3 includes some segments 9 and the upright ° C. display. Display member 4 is not actuated.

FIG. 3B shows the display assembly 1 presenting information in a second orientation, rotated 90° (clockwise) from the first orientation. Here, a portion of the second display member 4 is actuated. The actuated portion of the display member 4 includes some segments 9 and the corresponding 90° rotated ° C. display. Display member 3 is not actuated but allows the second display member 4 to be viewed therethrough.

FIG. 3C shows the display assembly 1 presenting information in a third orientation, rotated 90° from the second orientation (180° from the first orientation). Here, as with the first orientation, a portion of the first display member 3 is actuated. The actuated portion of the display member 3 includes some segments 9 and the inverted ° C. display. Display member 4 is not actuated.

FIG. 3D shows the display assembly 1 presenting information in a fourth orientation, rotated 90° from the third orientation (270° from the first orientation). Here, as with the second orientation, a portion of the second display member 4 is actuated. The actuated portion of the display member 4 includes some segments 9 and the corresponding 270° rotated ° C. display (i.e. the ° C. display which is inverted with respect to the ° C. display in the second orientation). Display member 3 is not actuated but allows the second display member 4 to be viewed therethrough.

Figure 4:
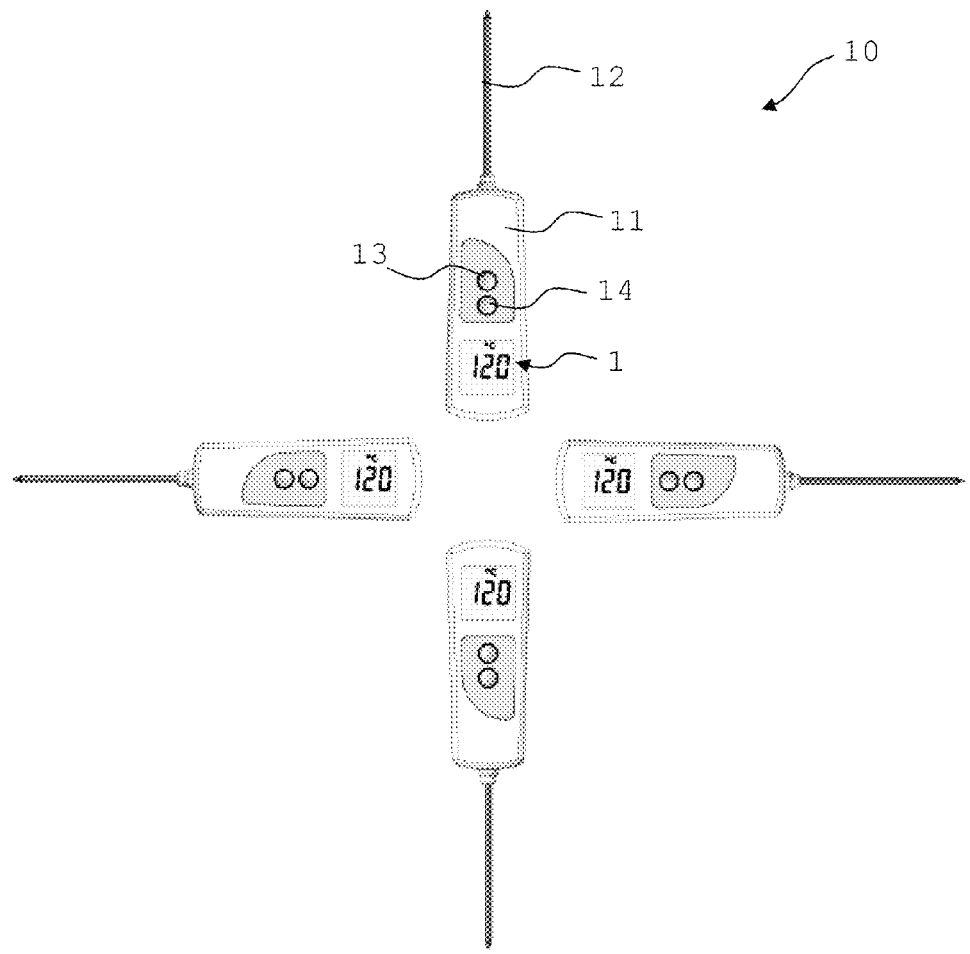
FIG. 4 shows four views of a thermometer incorporating the display assembly of FIGS. 1-3 at each of four orientations.

FIG. 4 shows a thermometer 10 comprising the display assembly of FIGS. 1-3. The thermometer 10 comprises a housing 11, a probe 12 and two actuators 13, 14. The actuators 13, 14 may be used to selectively actuate one or more display members 3, 4. The display assembly 1 can further comprise a sensor, the actuator being configured to selectively actuate one or more display members 3, 4 in response to a sensed parameter.

The sensor may be any type of sensor such as a proximity, light, force, speed, temperature, touch, IR or UV, humidity (rh), acidity/alkalinity (pH), electrical (V, mV, A, W) sensor or detector. In an exemplary embodiment, the sensor is an orientation sensor (such as an accelerometer) for detecting a change in orientation so that a particular display member 3, 4 may be actuated in response to the current, or a change in, the orientation detected. The actuator may be any type of actuator including a switch, a selector, a button and a touch screen.

The actuator may be manual—operable by a user to selectively actuate one or more display members 3, 4, or automatic—actuating without user interaction to the sensor input. The actuator may therefore be used to manually or automatically turn on/off one or more display members 3, 4. Furthermore, the actuator may be used to manually or automatically turn on/off any element of the display members 3, 4 such as the individual displays 6 or segments 9.

The probe 12 may comprise a sensor for measuring data. In the embodiment of FIG. 4 the probe comprises a thermocouple which directly (or indirectly) measures temperature, but in other embodiments the probe 12 may comprise an input for receiving data and/or an output for sending data, or any other kind of sensor such as a thermistor, a pt100 or a pt1000 temperature sensor for measuring data. Alternatively, the thermometer 10 may comprise a socket to plug in the probe 12. The thermometer 10 may also comprise a communications link for sending/receiving data and/or a storage for storing data.

Figure 5:
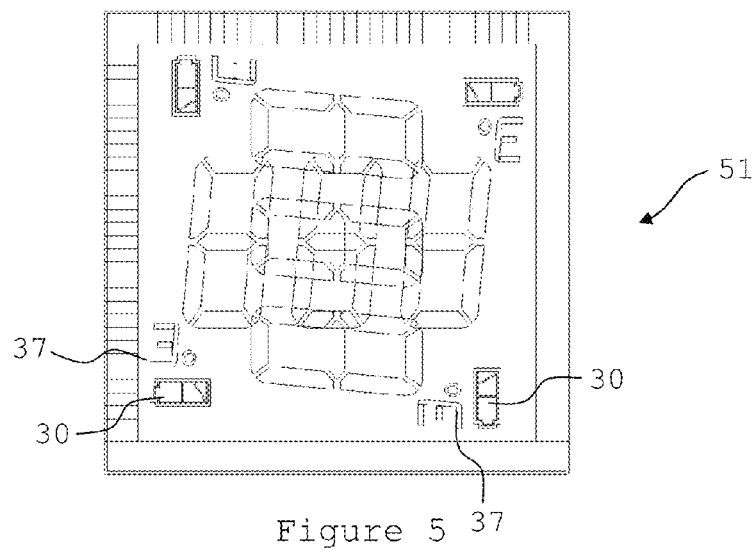
FIG. 5 shows a plan view of a second display assembly embodying the present invention.
Figure 6:
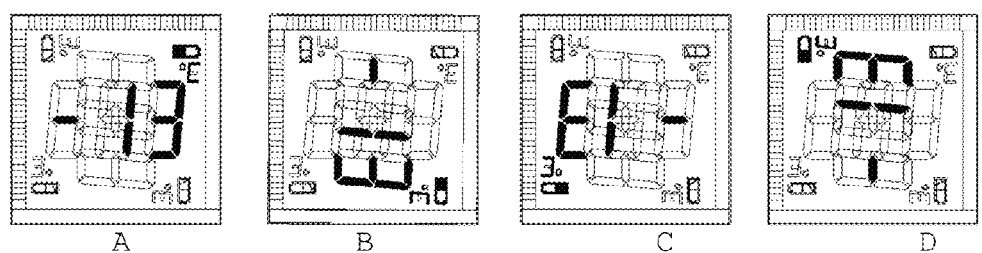
FIG. 6 shows four views (A-D) of the display assembly of FIG. 5 at each of four orientations: 0°, 90°, 180° and 270°.
Figure 7:
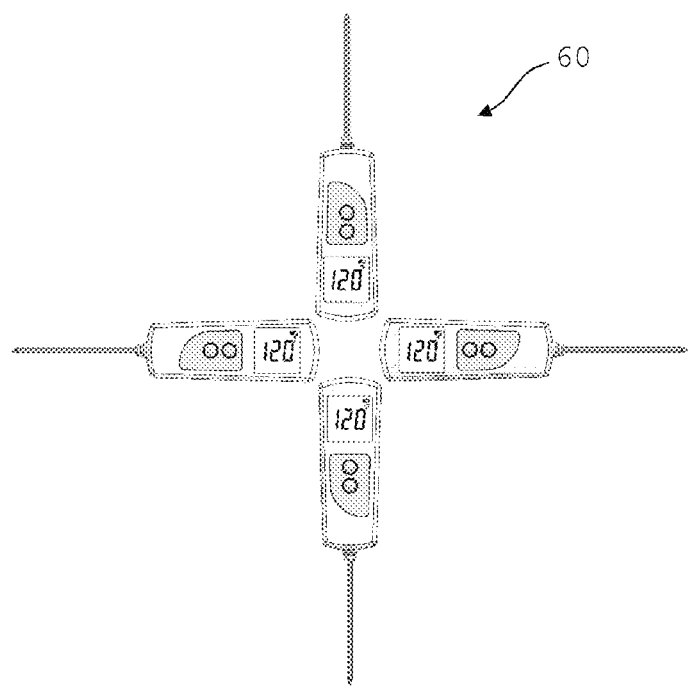
FIG. 7 shows four views of a second thermometer incorporating the display assembly of FIGS. 5 and 6 at each of four orientations.

FIGS. 5 to 7 illustrate a second exemplary embodiment of the claimed invention. The display assembly 51 has the same sandwich structure as the first embodiment, comprising a polarizer 2, a first display member 3, a second display member 4 and a backing member 5. The display members 3, 4 each comprise three seven-segment displays 6, a battery level indicator 30 and two ° C./° F. displays 37.

In this second embodiment, each display member 3,4 comprises one ° C./° F. display 37 and one battery indicator 30 located above and to one side of a linear arrangement of the three seven-segment displays 6. The second ° C./° F. display 37 and the second battery indicator 30 are located below and to one side of the three seven-segment displays 6, and are inverted.

FIG. 6 shows four views (A-D) of the display assembly 1, illustrating the "rotatable" nature of the display assembly 1.

Each of the first and second display members 3,4 can present information, including a data readout, a unit indicator and a battery level indicator, at two orientations (at 180° to one another) due to the symmetrical nature of the segment displays 6 and the use of the two ° C./° F. displays 37 and two battery indicator displays 30, wherein the first C/° F. display 37 and first battery indicator display 30 on a given display member 3,4 are inverted with the respect to the second C/° F. display 37 and battery indicator 30 on the same display member 3,4.

For the sake of clarity, the FIGS. 6A-D are not detailed further here as the explanation corresponds to the description of FIGS. 3A-D but with the ° C. display 7 replaced with a C/° F. display 37 and the display members 3,4 each further comprising two battery level indicators 30.

FIG. 7 shows a second thermometer 60 comprising the display assembly of FIGS. 5 and 6. Again, for the sake of clarity, FIG. 7 is not detailed further here as the explanation corresponds to the description of FIGS. 4.

In the exemplary embodiments of FIGS. 1-7, the display assembly 1, 51 is square and all side edges of the first display member 3 are parallel to and aligned with a corresponding side edge of the second display member 4. In other embodiments at least one side edge of a said display member 3,4 can be parallel to and aligned with at least one side edge of the other display member 3,4.

In the exemplary embodiments of FIGS. 1 to 7, the display members 3,4 comprise seven-segment displays 6 but any other type of display 6 may be used including fourteen (starburst) and sixteen-segment displays or comparable displays comprising illumination units such as LEDs.

In other embodiments, the assembly 1, 51 may comprise any number of display members 3, 4 or "layers", wherein at least one display member 3, 4 is fixed to, partially superimposed upon and rotated with respect to a second display member. Each display member 3, 4 may comprise any number of displays 6. For example, each display member 3, 4 could comprise two separate displays 6 such as two separate arrangements of LEDs. Each arrangement may only be viewable at a single orientation, the two arrangements being rotated with respect to one another. Furthermore, other measurement unit displays 7,37 may be used, such as "m" for meters "kg" for kilograms for example, rather than ° C./° F. for temperature.

Alternatively, four (or more) display members 3, 4 could be used, each comprising a single display. Each display member 3, 4 may provide one or more viewable orientations. Any combinations of any number of displays 6 and display members 3, 4 may be used.

Another exemplary embodiment comprises four display members 3, 4, each rotated by 90° with respect to another display member, for example, the first display member at 0°, the second display member at 90°, the third display member at 180° and a fourth display member at 270°, all orientations being considered from the same fixed point and in the same direction of rotation.

In the exemplary embodiments, the display members 3, 4 are flat panels but in other embodiments, these members may be curved panels or otherwise non-flat.

In the exemplary embodiments, each display member 3, 4 comprises contacts 8 along one side edge. In other embodiments, the contacts 8 may be along two or more side edges, for example depending on the number of displays used.

In the exemplary embodiments, the back panel 5 comprises a backing element such as glass and a rear transflective polarizer. The display assembly 1 may further comprise an illumination unit (not shown) such as an LED for lighting one or more of the display members 3,4 or any portion such as the front or back of the display assembly 1. In some embodiments, the rear polarizer may be transmissive or reflective, for example for a backlit display assembly 1 a transmissive-only back panel 5 may be used. Similarly, if no backlight is used, the polarizer may be reflective only.

In the exemplary embodiments, the display members 3, 4 are identical. In the assembly 1, 51, one display member is rotated by 90° with respect to the other display member, which results in the contacts 8 of the display members 3, 4 being on neighboring side edges. In other embodiments, the display members 3,4 may differ, for example to result in the contacts 8 being on the same side edge to become aligned and/or parallel when one display member 3,4 is rotated with respect to the other. Accordingly, the display members 3, 4 may or may not be centered.

In the exemplary embodiments, the display members 3, 4 are shown to be planar. The scope of the present invention is not limited to only planar arrangements. For example, the display assembly 1, 51 may comprise a display member 3, 4 which is not planar with respect to the other display member or members, i.e. a display member may be in an entirely different plane (perpendicular or otherwise) to that of another display member 3, 4. One further display assembly 1, 51 comprises the display members 3, 4 as shown in FIG. 2, wherein the display members 3, 4 are arranged in a sandwich of vertical planes, the assembly further comprising an additional display member in a horizontal plane above or below the other display members 3, 4.

In the assembly 1, 51, the display members 3, 4 are in a fixed structure. A suitable fixing means is any direct or indirect, permanent or semi-permanent fixing method such as adhesive, mechanical fixings, integral molding or similar means and methods.

The invention has numerous advantages, not least that the display assembly 1, 51 is compact, inexpensive and has low power requirements.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed:

1. A display assembly comprising first, second, third and fourth display members, wherein the first, second, third and fourth display members each comprise segment displays having a fixed viewing orientation; the second, third and fourth displays member are at least partially superimposed upon, fixed to and rotated a rotation with respect to the first display member, forming a sandwich of planar display members, the rotation being such that the first, second, third and fourth display members have different fixed viewing orientations that are angularly offset from one another relative to a single fixed point; and the first, second, third and fourth display members are selectively actuated exclusively.

2. The display assembly of claim 1, further comprising one or more additional display members, other than the first, second, third and fourth display members, wherein each additional display member in the assembly is rotated with respect to at least one other said display member in the assembly.

3. The display assembly of claim 2, wherein, when no said display members are actuated, each said display member is substantially viewable through one or more said other display members.

4. The display assembly of claim 1, wherein each display member is rotated by 90° with respect to another said display member in the assembly.

5. The display assembly of claim 1, wherein at least one side edge of one of the first, second, third and fourth display members is parallel to at least one side edge of another of the first, second, third and fourth display members.

6. The display assembly of claim 1, wherein an actuated first, second, third or fourth display member is viewable through all of the other said display members.

7. The display assembly of claim 1, wherein, when no said display members are actuated, each said display member is substantially viewable through one or more other display members.

8. The display assembly of claim 1, wherein each said display member comprises one or more seven-segment, fourteen-segment, or sixteen-segment displays, or any combinations thereof.

9. The display assembly of claim 1, wherein each said display member comprises three seven-segment displays and two ° C. displays.

10. The display assembly of claim 9, wherein one said ° C. display is located above a linear arrangement of the three seven-segment displays and a second said ° C. display is located beneath the three seven-segment displays and is inverted.

11. The display assembly of claim 1, wherein the first, second, third and fourth display members are arranged between a polarizer and a backing element comprising a rear transflective polarizer.

12. The display assembly of claim 1, further comprising an illumination unit for illuminating at least a portion of the display assembly.

13. The display assembly of claim 12, wherein the illumination unit comprises an LED.

14. The display assembly of claim 1, further comprising an actuator for selectively actuating one or more of the said display members.

15. The display assembly of claim 14, wherein the actuator comprises a manually-operable pushbutton, a switch or a selector.

16. The display assembly of claim 1, further comprising a sensor, wherein the assembly is configured to automatically selectively actuate one or more of the said display members in response to a sensed parameter.

17. The display assembly of claim 16, wherein the sensor is an orientation sensor.

18. The display assembly of claim 1, wherein each said display member comprises a contact, and the contacts on adjacent said display members are located on neighboring sides of the display members.

19. The display assembly of claim 1, further comprising an input for receiving data and/or an output for sending data.

20. The display assembly of claim 1, further comprising an input or an element for measuring data.

21. The display assembly of claim 20, wherein the element for measuring data is a thermocouple, a thermistor or a temperature sensor.

22. A thermometer comprising the display assembly according to claim 1.

23. The thermometer of claim 22, further comprising a housing, wherein the display assembly is retained by the housing and the display assembly is viewable through a window in the housing.

24. The display assembly of claim 1 wherein at least the first and second display members are identical.

* * * * *